United States Patent
Sambrani et al.

(10) Patent No.: US 11,068,850 B2
(45) Date of Patent: Jul. 20, 2021

(54) MANAGING ELECTRONIC ADDRESSES BASED ON COMMUNICATION PATTERNS

(75) Inventors: Hemanth Sambrani, Bangalore (IN); Sudharsan Vasudevan, Chennai (IN); Rohan Monga, Ludhiana (IN)

(73) Assignee: VERIZON MEDIA INC., New York, NY (US)

( * ) Notice: Subject to any disclaimer, the term of this patent is extended or adjusted under 35 U.S.C. 154(b) by 1847 days.

(21) Appl. No.: 12/471,351

(22) Filed: May 23, 2009

(65) Prior Publication Data

US 2010/0299397 A1  Nov. 25, 2010

(51) Int. Cl.
*G06Q 10/10* (2012.01)
*H04L 12/58* (2006.01)

(52) U.S. Cl.
CPC .......... *G06Q 10/107* (2013.01); *H04L 51/16* (2013.01)

(58) Field of Classification Search
CPC ..... G06Q 10/107; H04L 51/04; H04L 12/581; H04L 51/08; H04L 51/00; H04L 51/14; H04L 51/16; H04L 51/22; H04L 51/12; H04L 51/063
USPC ........................................................ 709/206
See application file for complete search history.

(56) References Cited

U.S. PATENT DOCUMENTS

| | | | |
|---|---|---|---|
| 7,158,986 B1 * | 1/2007 | Oliver | G06F 16/9535 |
| 9,319,367 B2 * | 4/2016 | Zeng | G06N 20/00 |
| 2002/0107930 A1 * | 8/2002 | Itoh | G06Q 10/107 |
| | | | 709/206 |
| 2004/0096043 A1 * | 5/2004 | Timmins et al. | 379/88.22 |
| 2005/0198144 A1 * | 9/2005 | Kraenzel | G06Q 10/107 |
| | | | 709/206 |
| 2007/0073871 A1 * | 3/2007 | Adams | G06Q 10/107 |
| | | | 709/224 |
| 2007/0288578 A1 * | 12/2007 | Pantalone | 709/206 |
| 2007/0299924 A1 * | 12/2007 | Tremblay | 709/206 |
| 2008/0071872 A1 * | 3/2008 | Gross | G06F 16/35 |
| | | | 709/206 |
| 2008/0071873 A1 * | 3/2008 | Gross | H04L 51/28 |
| | | | 709/206 |
| 2009/0177754 A1 * | 7/2009 | Brezina | G06F 16/9535 |
| | | | 709/206 |

(Continued)

OTHER PUBLICATIONS

Carvalho, "Cut Once—A Thunderbird extension for Recipient Prediction and Leak Detection," Jan. 19, 2008 [http://www.cs.cmu.edu/~wcohen/cutonce.pdf].*

(Continued)

*Primary Examiner* — Emmanuel L Moise
*Assistant Examiner* — Xiang Yu
(74) *Attorney, Agent, or Firm* — James J. DeCarlo; Greenberg Traurig, LLP

(57) ABSTRACT

Managing electronic addresses based on communication patterns. A method includes tracking metadata of a plurality of electronic communications of a user. One or more lists of electronic addresses of recipients are generated for the user based on the metadata. Electronic addresses of potential recipients are identified from the one or more lists in response to an input indicative of selection of an electronic address of a recipient. The identified electronic addresses are recommended to the user. An input indicative of one or more electronic addresses selected by the user from the identified electronic addresses is received. Further, an electronic message is sent to the selected electronic addresses.

14 Claims, 4 Drawing Sheets

(56) References Cited

U.S. PATENT DOCUMENTS

2010/0131523 A1* 5/2010 Yu ..................... G06Q 10/107
707/756
2010/0179961 A1* 7/2010 Berry ................... G06F 40/284
707/769
2010/0245262 A1* 9/2010 Vance .................. G06F 3/0482
345/173

OTHER PUBLICATIONS

Carvalho, "Email Leaks and Recipient Suggestions: A User Study with Mozilla Thunderbird" CHI Apr. 3-9, 2009, 2009, Boston, MA, USA [http://www.cs.cmu.edu/~vitor/papers/carvalho_iui09.pdf].*

Gmail Blog "New in Labs: Suggest more recipients", Apr. 17, 2009 [http://gmailblog.blogspot.com/2009/04/new-in-labs-suggest-more-recipients.html].*

Internet Archive Wayback Machine on Gmail Blog site, Apr. 18, 2009 [http://waybackmachine.org/20090515000000*/http://gmailblog.blogspot.com/2009/04/new-in-labs-suggest-more-recipients.html].*

Gmail Blog entry "New in Labs: Suggest more recipients" Apr. 17, 2009 [http://gmailblog.blogspot.com/2009/04/new-in-labs-suggest-more-recipients.html].*

Internet Archive Wayback Machine on Gmail Blog entry site, Apr. 18, 2009 [http://waybackmachine.org/20090515000000*/http://gmailblog.blogspot.com/2009/04/new-in-labs-suggest-more-recipients.html].* http://gmailblog.blogspot.com/2009/04/new-in-labs-suggest-more-recipients.html.

* cited by examiner

MANAGING ELECTRONIC ADDRESSES BASED ON COMMUNICATION PATTERNS

BACKGROUND

Various modes of electronic communications, for example, electronic mails, facsimiles, and instant messaging are used quite often by a user to communicate with other users. Every time the user drafts a message, the user needs to recall or look up and insert electronic addresses of intended recipients. Over a period of time, the network of the user might grow and hence, the number of intended recipients might increase. With increasing numbers of intended recipients, the user might find it difficult to remember the intended recipients and might forget to include electronic addresses of a few of the intended recipients while drafting a message. Therefore, there is a need for a way to manage recipient address lists.

Currently existing techniques allows a user to create a single electronic address for a group of recipients. The user can then include the single electronic address and the message can be sent to all members of the group. However, as the number of groups of recipients increases, the number of such single electronic addresses also increases and it becomes complex for the user to manage. Moreover, the user needs to manually add or delete a recipient from the group of recipients having the single electronic address.

One of the existing techniques includes suggesting recipients to a user while drafting an email message. However, the technique includes inputting at least two email ids before any suggestion is made. Moreover, the user is required to click on each suggested recipient to include the suggested recipient. This leads to time inefficiency and user inconvenience.

In light of the foregoing discussion, there is a need for an efficient technique for managing electronic addresses.

SUMMARY

Embodiments of the present disclosure described herein provide a method, system and article of manufacture for managing electronic addresses based on communication patterns.

An example of a method includes electronically tracking metadata of a plurality of electronic communications of a user. One or more lists of electronic addresses of recipients are generated for the user based on the metadata. Electronic addresses of potential recipients are identified from the one or more lists in response to an input indicative of selection of an electronic address of a recipient. The identified electronic addresses are recommended to the user. An input indicative of one or more electronic addresses selected by the user from the identified electronic addresses is then received. Further, an electronic message is sent to the selected electronic addresses.

An example of a system includes electronic communication software. The system also includes a communication interface that enables sending and receiving of a plurality of electronic communications. Further, the system also includes a processor responsive to the electronic communication software to track metadata of a plurality of electronic communications of a user, generate one or more lists of electronic addresses of recipients for the user based on the metadata, to identify electronic addresses of potential recipients from the one or more lists in response to an input indicative of selection of an electronic address of a recipient, and to recommend the identified electronic addresses to the user.

An example of an article of manufacture includes a machine-readable medium, and instructions carried by the medium and operable to cause a programmable processor to perform tracking metadata of a plurality of electronic communications of a user. One or more lists of electronic addresses of recipients are generated for the user based on the metadata. Electronic addresses of potential recipients are identified from the one or more lists in response to an input indicative of selection of an electronic address of a recipient. The identified electronic addresses are recommended to the user. An input indicative of one or more electronic addresses selected by the user from the identified electronic addresses is received. A message is sent to the selected electronic addresses.

DETAILED DESCRIPTION OF THE EMBODIMENTS

Figure 1:
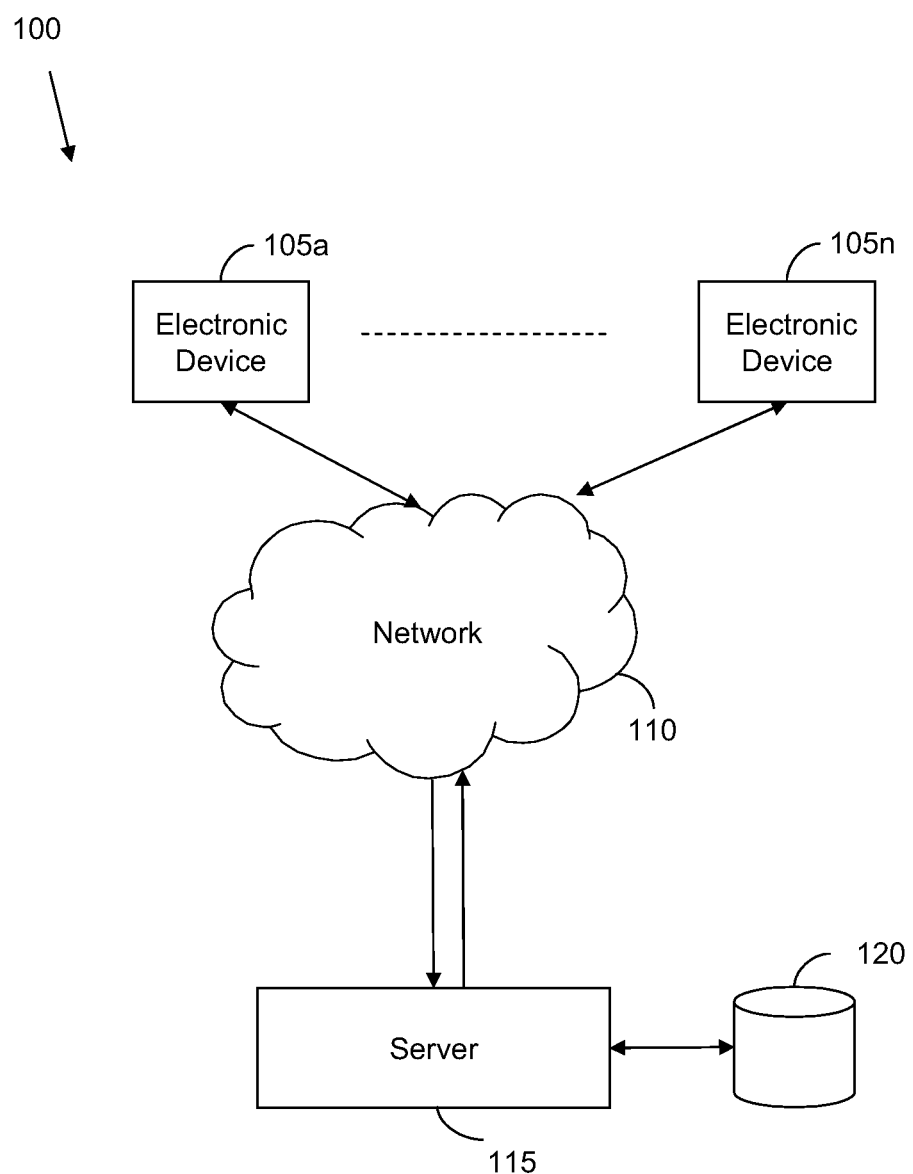
FIG. 1 is a block diagram of an environment, in accordance with which various embodiments can be implemented.

FIG. 1 is a block diagram of an environment 100, in accordance with which various embodiments can be implemented. The environment 100 includes a plurality of electronic devices, for example an electronic device 105a and an electronic device 105n, connected to each other through a network 110. Examples of the electronic devices include, but are not limited to, computers, laptops, mobile devices, hand held devices, internet protocol televisions, and personal digital assistants (PDAs). Examples of the network 110 include, but are not limited to, a Local Area Network (LAN), a Wireless Local Area Network (WLAN), a Wide Area Network (WAN), internet, intranet, wired network, wireless network and a Small Area Network (SAN). The electronic devices are also connected to a server 115 through the network 110.

A user of the electronic device 105a can make electronic communications with other users (recipients) using their electronic addresses. An electronic communication refers to transmission of a message by an electronic device. Examples of the electronic communications include, but are not limited to, electronic mails (emails), short message services (SMS), facsimiles, instant messages, enterprise groupware application based communications, text messages and posting scraps. Examples of the electronic addresses include, but are not limited to, email addresses, phone numbers, messenger identifiers (ids), and user ids. The electronic device 105a of the user acts as an interface that is in communication with the server 115 and can be remotely located from the server 115.

The electronic communications can be routed through the server 115 and metadata of the electronic communications can be tracked by the server 115. The metadata includes at least one of: electronic addresses in a "to" list, electronic addresses in a carbon copy list, electronic addresses in a blind carbon copy list, and time and date of the electronic communications. In some embodiments, the electronic communications can be obtained from other servers, for example web servers, connected to the server 115.

The server 115 generates one or more lists of the electronic addresses of the recipients, for the user, based on the metadata. The lists can include one or more lists of a first type and one or more lists of a second type. Each list of the first type includes logically-grouped electronic addresses of the recipients. The electronic addresses of the recipient are coherent (logically related to each other based on different features). Examples of the features include, but are not limited to, priority assigned to the electronic communications, recency of the electronic communications, time of response to the electronic communications, total number of electronic communications between the user and the recipients, frequency of electronic communications, subjects of the electronic communications, and attachment information in the electronic communications. Each list of the second type includes the electronic addresses of the recipients with whom the user has interacted previously as a whole or to whom the user has sent the electronic communications as a group. In other aspect, the list of the second type includes several groups of the electronic addresses. A group includes one or more electronic addresses.

The server 115 can be connected to a storage device 120. The storage device 120 is a physical device that can store the lists. In some embodiments, the lists can be stored in a storage medium or memory of the server. The lists can be updated by the server 115 periodically or every time the user makes an electronic communication.

In some embodiments, the electronic device 105*a* can track metadata and generate one or more lists of the electronic addresses of the recipients, for the user of the electronic device 105*a*, based on the metadata. The lists of electronic addresses of the recipients can be generated for the user and stored in the electronic device 105*a*.

When the user inputs an electronic address of a recipient to whom the user intends to send a message, then the server 115 or the electronic device 105*a* can identify the electronic addresses of potential recipients from the lists after receiving the input. The input indicates intention of the user to include more electronic addresses. The input can also include a comma (,) or any other way to indicate the intention of the user to incorporate more electronic addresses. The potential recipients can be defined as the recipients to whom the user may intend to send the message or intend to make any other electronic communication and can be determined by the server 115 or the electronic device 105*a* using the metadata.

The server 115 or the electronic device 105*a* then recommends the identified electronic addresses either separately or in the form of one or more groups to the user of the electronic device 105*a*. A group can be defined as combination of two or more electronic addresses. The user can then select one or more electronic addresses of recipients from the recommendation. The selected one or more electronic addresses of recipients can be received by the server 115 or the electronic device 105*a* as an input or a signal. The input indicates completion of selection of the electronic addresses. The input can also include clicking on a "Send" button, or any other way of communicating the intention that the selection of the electronic addresses is complete, for example by moving a cursor away from the tab provided to enter the electronic addresses. The server 115 sends the message through the network 110 to the selected electronic addresses in response to the input. The selected electronic addresses include the one or more electronic addresses selected by the user and one or more electronic addresses of recipients inputted by the user.

The server 115 includes a plurality of elements for recommending the electronic addresses of the potential recipients to the user. The server 115 including the elements is explained in detail in FIG. 2.

Figure 2:
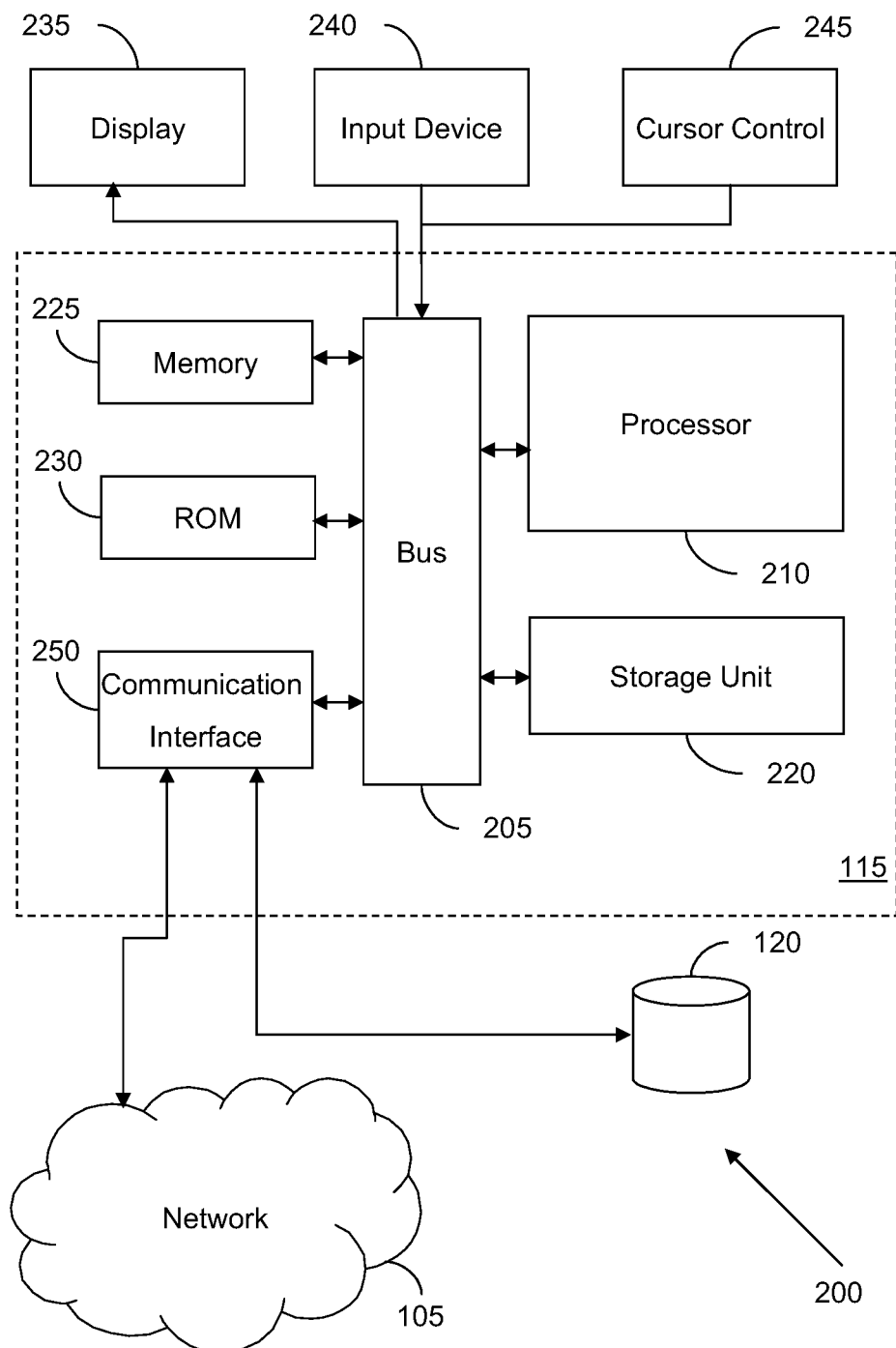
FIG. 2 is a block diagram of a server, in accordance with one embodiment.

FIG. 2 is a block diagram of the server 115, in accordance with one embodiment. The server 115 includes a bus 205 or other communication mechanism for communicating information, and a processor 210 coupled with the bus 205 for processing information. The server 115 also includes a memory 225, such as a random access memory (RAM) or other dynamic storage unit, coupled to the bus 205 for storing information and instructions to be executed by the processor 210. The memory 225 can be used for storing temporary variables or other intermediate information during execution of instructions to be executed by the processor 210. The server 115 further includes a read only memory (ROM) 230 or other static storage unit coupled to bus 205 for storing static information and instructions for processor 210. A storage unit 220, such as a magnetic disk or optical disk, can be provided and coupled to the bus 205 for storing information.

The server 115 can be coupled via the bus 205 to a display 235, such as a cathode ray tube (CRT), for displaying information to a user. An input device 240, including alphanumeric and other keys, is coupled to bus 205 for communicating information and command selections to the processor 210. Another type of user input device is a cursor control 245, such as a mouse, a trackball, or cursor direction keys for communicating direction information and command selections to the processor 210 and for controlling cursor movement on the display 235.

Various embodiments are related to the use of server 115 for implementing the techniques described herein. The techniques can be performed by the server 115 in response to the processor 210 executing instructions included in the memory 225. The instructions can be present in form of electronic communication software. Such instructions can be read into the memory 225 from another machine-readable medium, such as the storage unit 220. Execution of the instructions included in the memory 215 causes the processor 210 to perform the process steps described herein.

The term "machine-readable medium" as used herein refers to any medium that participates in providing data that causes a machine to operate in a specific fashion. In one embodiment implemented using the server 115, various machine-readable media are involved, for example, in providing instructions to the processor 210 for execution. The machine-readable medium can be a storage medium. Storage media include both non-volatile media and volatile media. Non-volatile media include, for example, optical or magnetic disks, such as storage unit 220. Volatile media include dynamic memory, such as the memory 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a PROM, and EPROM, a FLASH-EPROM, any other memory chip or cartridge.

In some embodiments, the machine-readable media may include a RAM.

In some embodiments, the machine-readable medium can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include but are not limited to carrier waves as describer hereinafter or any other media from which the server 115 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 225, from which the processor 210 retrieves and executes the instructions. The instructions received by the memory 225 can optionally be stored on storage unit 220 either before or after execution by the processor 210. All such media must be tangible to enable the instructions carried by the media to be detected by a physical mechanism that reads the instructions into a machine.

The server 115 also includes a communication interface 250 coupled to the bus 205. The communication interface 250 provides a two-way data communication coupling to the network 105. For example, the communication interface 250 can be an integrated services digital network (ISDN) card or a modem to provide a data communication connection to a corresponding type of telephone line. As another example, the communication interface 250 can be a local area network (LAN) card to provide a data communication connection to a compatible LAN. Wireless links can also be implemented. In any such implementation, the communication interface 250 sends and receives electrical, electromagnetic or optical signals that carry digital data streams representing various types of information. Further, the communication interface 250 enables sending and receiving of a plurality of electronic communications from a user.

The metadata of the electronic communications can be tracked by the processor 210. The processor 210 generates one or more lists of the electronic addresses of the recipients, for the user, based on the metadata. The lists of electronic addresses of the recipients can be generated for each user by the processor 210 and stored. The lists can be updated by the processor 210 periodically or every time the user makes an electronic communication.

When the user inputs an electronic address of a recipient to whom the user intends to send a message then the processor 210 can identify the electronic addresses of potential recipients from the lists after receiving the input as a signal.

The processor 210 then recommends the identified electronic addresses either separately or in the form of one or more groups to the user. The user can then select one or more electronic addresses of recipients from the recommendation. The selected one or more electronic addresses of recipients can be received by the processor 210 as an input or a signal. The processor 210 sends the message through the network 110 to the selected electronic addresses in response to the input indicating the selected electronic addresses.

In some embodiments, the processor 210 can include one or more processing units for performing one or more functions of the processor 210. The processing units are hardware circuitry performing specified functions.

Figure 3:
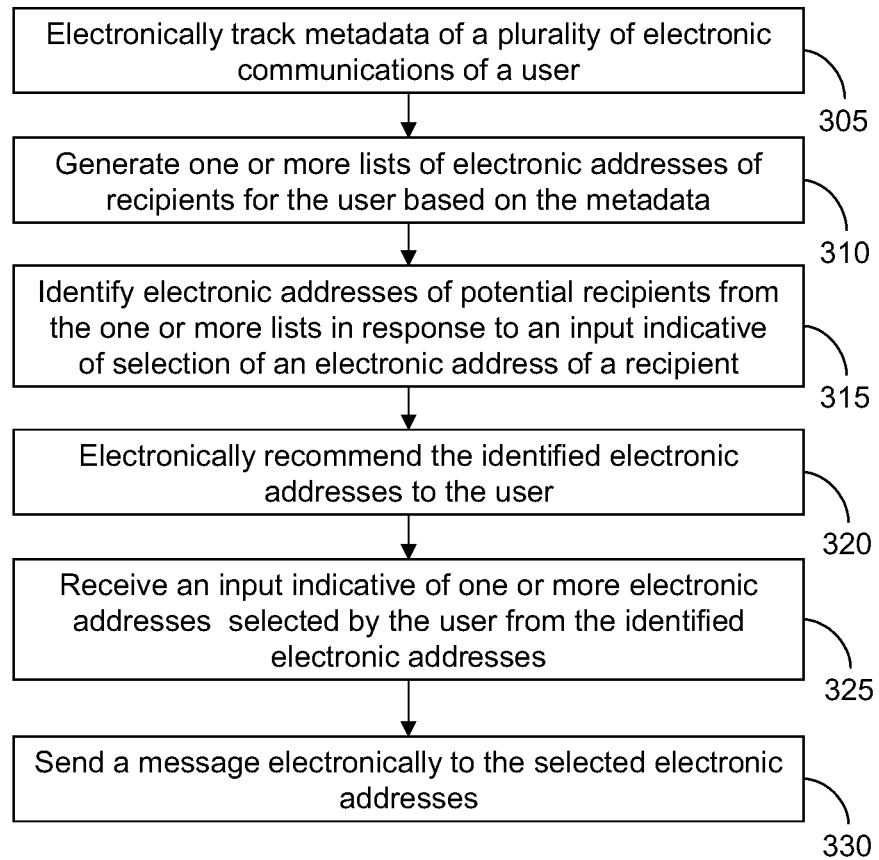
FIG. 3 is a flowchart illustrating a method for managing electronic addresses, in accordance with one embodiment.

FIG. 3 is a flowchart illustrating a method for managing electronic addresses, in accordance with one embodiment.

A user can communicate with other users through various modes of electronic communications, for example emails, SMS, facsimiles, instant messaging, enterprise groupware application based communications, and posting scraps.

At step 305, metadata of a plurality of electronic communications of the user are tracked. The metadata includes electronic addresses of recipients. The metadata also includes at least one of time and date of the electronic communications. Further, the metadata can include electronic addresses in a "to" list, electronic addresses in a carbon copy list, and electronic addresses in a blind carbon copy list.

The tracking of metadata can be performed in a server. The user can communicate with the server through an interface, such as an electronic device, that can be remotely located from the server.

In some embodiments, contents of the electronic communications can also be tracked. The contents can include subject of a message and body of the message.

At step 310, one or more lists of electronic addresses of recipients are generated for the user based on the metadata. The metadata of the electronic communications, made by the user, is analyzed to identify communication patterns of the user and generate the lists. The lists can include one or more lists of first type and one or more lists of second type. Each list of first type includes the electronic addresses of the recipients which are grouped logically (friends, colleagues and so on). The electronic addresses of the recipient are coherent (logically related to each other based on different features). Examples of the features include, but are not limited to, priority assigned to the electronic communications, recency of the electronic communications, time of response to the electronic communications, total number of electronic communications between the user and the recipients, frequency of electronic communications, subjects of the electronic communications, attachment information in the electronic communications, and periodicity of electronic communications, and time of first communication to the recipients. Each list of the second type includes the electronic addresses of the recipients with whom the user has interacted previously as a whole or to whom the user has sent the electronic communications as a group.

For example, consider user A makes electronic communications with following clusters of electronic addresses:

F1@evlg.com and F2@evlg.com—38 times,

F1@evlg.com, F2@evlg.com, and CF1@yahoo.com—20 times,

F1@evlg.com, F2@evlg.com, CF1@yahoo.com, and CF2@yahoo.com—24 times,

F1@evlg.com, CF1@yahoo.com, CF2@yahoo.com, and CB2@yahoo.com—18 times,

C1@evlg.com, CF1@yahoo.com, CF2@yahoo.com, and CB2@yahoo.com—20 times, and

C1@evlg.com, CB2@yahoo.com, B1@evlg.com, and B2@evlg.com—5 times

A composite weight can be assigned to each cluster and to each electronic address separately based on different features that can be extracted from the electronic communications. The assigning of composite weights can be referred to as prioritizing the electronic addresses.

Various algorithms can be used for determining the list of the first type. One exemplary algorithm includes maintaining a set, SU, of sets of recipients for every user, U, along with a count of number of communications between that set of recipients and the user. The count is initially set to zero. When the user U electronically communicates, for example, through an email, with multiple recipients S the system generates a powerset 2^S. The counts of those members of SU which are also members of 2^S is incremented. The counts are representative of cohesion of each of SU. A list of subsets of 2^S, ordered on these counts can be defined as the list of the first type. To factor in temporal locality, a decay function can be applied on each SU, which can ensure that the current most frequently messaged recipients are given the highest priority. Such measures can ensure high relevance that is sensitive to time as well as frequency of communication.

The following sets can be generated since they have the highest clustering density. The values used here are exemplary. A value indicates the total number of communications that the user has made using a particular electronic address. For example, the user has communicated 100 times (38+20+24+18) with the electronic address, F1@evlg.com.

F1@evlg.com=100
F2@evlg.com=82
CF1@yahoo.com=82
CF2@yahoo.com=62
C1@evlg.com=25
CB2@yahoo.com=25
B1@evlg.com=5
B2@evlg.com=5

From these values, combinations can be generated and the corresponding frequencies can be used to create the lists of the first type in decreasing order of clustering density.

Few exemplary lists of the first type in order of decreasing interaction factor can then be:
LOGICAL GROUP OF FRIENDS: F1@evlg.com, F2@evlg.com, CF1@yahoo.com, CF2@yahoo.com
LOGICAL GROUP OF COLLEAGUES: CF1@yahoo.com, CF2@yahoo.com, C1@evlg.com, CB2@yahoo.com
LOGICAL GROUP OF BASKETBALL TEAMMATES: C1@evlg.com, CB2@yahoo.com, B1@evlg.com, B2@evlg.com Various algorithms can be used for determining the list of the second type. One exemplary algorithm includes maintaining a set, SG, of sets of recipients for every user, U, along with a count of number of communications between that set of recipients and the user. The count is initially set to zero. When the user, U, sends an email with multiple recipients, S, the system increments the count of SG for the set S. To factor in temporal locality, a decay function can be applied to each set SI in SG which can ensure that the current most frequently messaged group is given the highest priority. Such measures can ensure high relevance that is sensitive to time as well as frequency of communication.

The list of the second type includes the electronic addresses with whom the user has interacted as a whole or together for more than a predefined number of times. Such electronic addresses are grouped into a group. For example, if the predefined number of times is considered as 21 then the list of the second type in order of priority can then include:
F1@evlg.com and F2@evlg.com—38 times
F1@evlg.com, F2@evlg.com, CF1@yahoo.com, and CF2@yahoo.com—24 times In some embodiments, the list of the second type includes the electronic addresses for which the number of interactions is more than a predefined number. The number of interactions can be detected by multiplying the number of electronic communications with the number of electronic addresses in the group. For example, consider the group including F1@evlg.com, F2@evlg.com, CF1@yahoo.com, and CF2@yahoo.com. The number of interactions is detected as "24*4", wherein "24" indicates that the user has communicated with the group 24 times and "4" indicates the four members of the group.

F1@evlg.com, F2@evlg.com, CF1@yahoo.com, CF2@yahoo.com=24*4
C1@evlg.com, CB2@yahoo.com, CF1@yahoo.com, CF2@yahoo.com=20*4
CB2@yahoo.com, B1@evlg.com, B2@evlg.com=5*3

For example, if the predefined number is considered as 16 the list of the second type can then include:
F1@evlg.com, F2@evlg.com, CF1@yahoo.com, CF2@yahoo.com=24*4
C1@evlg.com, CB2@yahoo.com, CF1@yahoo.com, CF2@yahoo.com=20*4

At step 315, electronic addresses of potential recipients from the one or more lists are identified in response to an input indicative of selection of an electronic address of a recipient.

The user composes a message and enters an electronic address of a recipient. The user can then enter a comma (,) or any other symbol to indicate the user's intention to incorporate more electronic addresses. The input including the electronic address and any other symbol can be referred to as a signal or an input indicative of the electronic address of the recipient selected by the user. Further, the input also indicates intention of the user to include a plurality of recipients to a current set of recipients.

Various algorithms can be used for identifying the list of the first type. An exemplary algorithm is as follows:

When user A composes a message and includes a set scurr, an ordered list lcurr can be generated using the following algorithm.

From SU choose all (si, c) as S such that scurr $\subseteq$ si and c more than threshold,
Generate ltemp ordered descending on c from S
For each sk $\in$ ltemp project the members of sk $\notin$ scurr as lcurr For example, if the input is CF2@yahoo.com then following electronic addresses can be identified in order of priority from the list of the first type:
F1@evlg.com, F2@evlg.com, CF1@yahoo.com, C1@evlg.com, and CB2@yahoo.com.

Various algorithms can be used for identifying the list of the second type. An exemplary algorithm is as follows:

When user A composes a new message and includes a set scurr, the system creates an ordered list lcurr that is generated using the following algorithm.

From SU choose all (si, c) as S such that scurr $\subseteq$ si and c more than threshold,
Generate lcurr ordered descending on c from S The terms used in the algorithms indicates the following:
Set scurr represents electronic addresses of recipients currently selected by the user
Set lcurr represents the list of first type
Set SU represents an exhaustive list, including the one or more lists, of electronic addresses of all recipients with which user has communicated
Set ltemp represents a temporary set used for filtering electronic addresses of recipients
Set lcurr represents the list of first type recommended to the user For example, if the input is CF2@yahoo.com then following groups can be identified from the list of the second type:

F1@evlg.com, F2@evlg.com, CF1@yahoo.com, CF2@yahoo.com

C1@evlg.com, CB2@yahoo.com, CF1@yahoo.com, CF2@yahoo.com.

At step 320, the identified electronic addresses are electronically recommended to the user. The electronically recommending includes providing the identified electronic addresses separately and providing the identified electronic addresses in form of one or more groups based on a predefined threshold. The predefined threshold can be different for providing the identified electronic addresses separately and providing the identified electronic addresses in form of one or more groups. For example, if the predefined threshold is 7 for providing the identified electronic addresses separately, then only 7 identified electronic addresses are selected and displayed in decreasing order of priority to the user. If the predefined threshold is 2 for providing the identified electronic addresses in form of groups, then only 2 groups are selected and displayed in decreasing order of priority to the user.

The identified electronic addresses from the lists of the first type and the lists of the second type can be displayed in response to selection of CF2@yahoo.com as follows:

SEPARATELY
F1@evlg.com,
F2@evlg.com,
CF1@yahoo.com,
C1@evlg.com
CB2@yahoo.com
 AS GROUPS
CF2@yahoo.com, F1@evlg.com, F2@evlg.com, CF1@yahoo.com
CF2@yahoo.com, C1@evlg.com, CB2@yahoo.com, CF1@yahoo.com In some embodiments, when the identified electronic addresses are displayed as a group then the electronic address already selected from that group may not be displayed. The identified electronic addresses can then be displayed:

AS GROUPS
F1@evlg.com, F2@evlg.com, CF1@yahoo.com
C1@evlg.com, CB2@yahoo.com, CF1@yahoo.com At step 325, an input is received indicative of one or more electronic addresses selected by the user from the identified electronic addresses. The user selects a separate electronic address or a group which can be referred to as an input or a signal indicating selection of one or more electronic addresses from the identified electronic addresses.

In some embodiments, the identified electronic addresses are filtered in response to the input indicative of the electronic addresses selected by the user. Further, the filtering is an iterative process. For example, if the user further selects C1@evlg.com then revised recommendations include:

SEPARATELY
CB2@yahoo.com,
CF1@yahoo.com
 AS GROUPS
CF2@yahoo.com, C1@evlg.com, CB2@yahoo.com, CF1@yahoo.com The lists are updated on completion of the electronic communication in response to the selection. In one embodiment, the lists can also be updated at regular time intervals. The weights assigned to each cluster and to each electronic address separately can also be updated.

At step 330, a message is send electronically to the selected electronic addresses or any other form of electronic communication can be performed. The message can be sent instantaneously or at any point of time in future.

In some embodiments, an electronic address of a recipient, not used previously with the selected electronic addresses can be detected. The user can be informed of the detected electronic address by highlighting, beep sound, audio or any other means of indication. The user can then continue sending the message with the detected electronic address or can delete the detected electronic address.

In some embodiments, step 325 and 330 may not be performed. The electronic addresses recommended to the user may be used for some customization or processing, for example by the user, and saved for future use.

Figure 4:
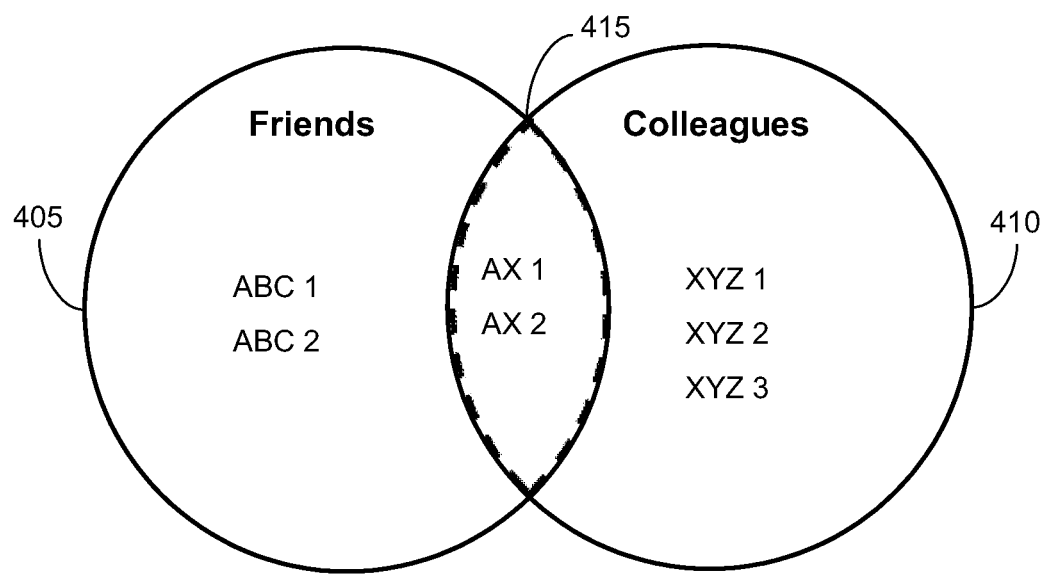
FIG. 4 is an exemplary illustration of managing electronic addresses, in accordance with one embodiment.

The method described in FIG. 3 is explained in detail in conjunction with FIG. 4.

FIG. 4 is an exemplary illustration of managing electronic addresses, in accordance with one embodiment.

Table 1 illustrates names of personnel and corresponding electronic addresses of the personnel with whom the user often makes electronic communications.

TABLE 1

| Name | Electronic address |
|------|--------------------|
| ABC1 | ABC1@yahoo.com |
| ABC2 | ABC2@yahoo.com |
| AX1  | AX1@yahoo.com |
| AX2  | AX2@yahoo.com |
| XYZ1 | XYZ1@yahoo.co.in |
| XYZ2 | XYZ2@yahoo.co.in |
| XYZ3 | XYZ3@yahoo.co.in |

The electronic communications of the user are tracked and the metadata of the electronic communications is analyzed. Various features can be extracts from the electronic communications and one or more lists can be generated based on the features. The lists include a list of first type and a list of second type. The list of first type includes logical groupings of the personnel (recipients). The list of second type includes logical groupings of the personnel (recipients) to whom the user has sent electronic communication previously as a whole for more than a predetermined number of occurrences. Table 2 illustrates the lists of first type. Table 2 includes a friends list 405 and a colleagues list 410 which are the lists of the first type. It will be appreciated that friends and colleagues are exemplary names allotted to the lists.

TABLE 2

| Friends list 405 | Colleagues list 410 |
|------------------|---------------------|
| (ABC1@yahoo.com, ABC2@yahoo.com, AX1@yahoo.com, AX2@yahoo.com) | (AX1@yahoo.com, AX2@yahoo.com, XYZ1@yahoo.co.in, XYZ2@yahoo.co.in, XYZ3@yahoo.co.in) |

Table 3 illustrates the lists of second type. Table 3 includes lists 1, lists 2 and lists 3 which are the lists of the second type to whom the communications is sent more than a predefined number of times.

TABLE 3

| List 1 | List 2 |
|---|---|
| (ABC2@yahoo.com, AX1@yahoo.com, AX2@yahoo.com) | (AX1@yahoo.com, AX2@yahoo.com, XYZ1@yahoo.co.in, XYZ3@yahoo.co.in) |

A set 415 of common personnel (AX1 and AX2) exists between the friends list 405 and the colleagues list 410.

An input indicative of selection of an electronic address of a recipient is received and electronic addresses are identified from the lists in response to the input. An electronic address inserted by the user can be considered as the input.

EXAMPLE 1

In one example, the user inserts AX1@yahoo.com as the recipient. The recipient AX1 corresponding to the electronic address AX1@yahoo.com falls in the set 415. The electronic addresses are identified from the lists and recommended to the user. The electronic addresses are recommended to the user separately or as groups or both. Table 4 illustrates the electronic addresses recommended separately in order of priority and as groups in order of priority.

TABLE 4

| Separately | As Groups |
|---|---|
| AX2@yahoo.com | (ABC2@yahoo.com, AX1@yahoo.com, AX2@yahoo.com) |
| ABC1@yahoo.com | |
| ABC2@yahoo.com | |
| XYZ1@yahoo.co.in | (AX1@yahoo.com, AX2@yahoo.com, XYZ1@yahoo.co.in, XYZ3@yahoo.co.in) |
| XYZ2@yahoo.co.in | |
| XYZ3@yahoo.co.in | |

The user can then select a group of electronic addresses or an individual electronic address. The recommendations are then refreshed dynamically. For example, if the user selects ABC1@yahoo.com then the refreshed recommendation includes AX2@yahoo.com and ABC2@yahoo.com.

EXAMPLE 2

In another example, the user inserts ABC2@yahoo.com as the recipient, which is taken as the input. The electronic addresses are identified from the lists and recommended to the user. The electronic addresses are recommended to the user separately or as groups or both. Table 5 illustrates the electronic addresses recommended separately in order of priority and as groups in order of priority.

TABLE 5

| Separately | As Groups |
|---|---|
| AX2@yahoo.com | (ABC2@yahoo.com, AX1@yahoo.com, AX2@yahoo.com) |
| ABC1@yahoo.com | |
| AX1@yahoo.com | |

The user can then selects a group of electronic addresses or an individual electronic address.

After the electronic addresses are selected the message is then sent to those electronic addresses. The inputs received from the used can be used for updating the lists.

Various use case of the method described above includes:

Use Case 1

Emails of a user are tracked for a period of time to learn the communication patterns of the user. Further, a threshold value is set, for example, five. The threshold value is indicative of the total number of emails communicated between the user and recipients.

The user then sends an email to "A" and "B". It is detected that the threshold value is reached. This triggers providing an option to the user to create a group including recipients "A" and "B". The option can be provided as a pop-up message to the user. Further, the user can enter an appropriate name for the group.

Use Case 2

A user composes an email reply by clicking on option "reply all". The "reply all" includes the sender of the original email and all other recipients of the email.

In one example the "reply all" includes recipients, "A", "B", "C" and "D". In case person "D" has not been an active recipient in the past with respect to the recipients including "A", "B" and "C", the email address of "D" is brought to the attention of the user in some form, for example in color "red". The user can then be prompted to confirm inclusion or exclusion of "D" as a recipient.

Use Case 3

Group chats in messenger. A set of operations personnel discussing a production issue will use group chat functionality in Yahoo® Messenger. If the set of people is large then automatic inclusion of missing members can be suggested.

Use Case 4

In case of a cold start, for example, a new user to Yahoo® 360° but has been there in Yahoo® Mail for a long time then suggestions can be made regarding other recipients.

Use Case 5

A list of phone numbers can be suggested to the user drafting a SMS.

In some embodiments, the recommendation based on communication patterns can be provided as an additional facility to the user which the user can enable and disable based on needs.

Use Case 6

Emails of a user are tracked over a period of time and following list of first type is generated based on logical relations:

A, B, C, D and E

A, B, E, F

A user composes an email and enters electronic addresses of recipients A, B, E and G. The following electronic addresses of recipients are recommended to the user:

C

D

F which are present in the list of the first type.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. A method comprising:

electronically tracking, via a computing device, metadata of a plurality of electronic communications of a user, said metadata comprising a time and date and one or more recipient addresses associated with each communication;

analyzing, via the computing device, the metadata of each electronic communication;

determining, via the computing device, based on said analysis for each electronic communication, features of each communication between the user and each recipient address, each communication's features comprising activity data between the user and a respective recipient, said activity data indicating a recency and frequency of communication and content relayed during such communications;

determining, via the computing device, coherency information for the plurality of electronic communications based on said determined features of each electronic communication and the activity data that indicates the recency, frequency and content of each communication comprised therein, said coherency information providing an indication as to a logical relationship between each recipient that is defined according to the recency and frequency of communication between each recipient and content relayed during such communications;

automatically generating and storing, via the computing device based on said electronic tracking, one or more lists of addresses based on said coherency information;

receiving, at the computing device, input comprising an entry of a portion of an electronic address;

identifying, via the computing device, electronic addresses of potential recipients from the one or more lists in response to said input;

electronically recommending, via the computing device, the identified electronic addresses to the user, said recommendation facilitating the simultaneous display of a list of a first type of electronic addresses and a list of a second type of electronic addresses;

receiving, via the computing device, an input indicative of one or more electronic addresses selected by the user from the identified and recommended electronic addresses;

responsive to receiving the selecting input, dynamically updating and filtering, via the computing device, the electronic recommendations of identified electronic addresses for both lists; and electronically sending, via the computing device, a message to the one or more selected electronic addresses.

2. The method of claim 1, wherein the steps of electronically tracking and electronically sending are performed in a server, and wherein the user communicates with the server through an interface that is remotely located from the server.

3. The method of claim 1 further comprising:
tracking contents of the plurality of electronic communications.

4. The method of claim 1 further comprising:
detecting usage of a plurality of electronic addresses together for more than a predefined number of occurrences; and
grouping the plurality of electronic addresses into a group.

5. The method of claim 1 further comprising:
detecting an electronic address not used previously with the selected electronic addresses; and
informing the user of the detected electronic address.

6. The method of claim 1 further comprising:
updating the one or more lists; and
storing the one or more lists.

7. The method of claim 1, wherein the step of generating comprises:
prioritizing the electronic addresses.

8. The method of claim 1, wherein the electronically recommending comprises:

providing the identified electronic address in the form of one or more groups based on a predefined threshold.

9. A system comprising:
a communication interface that enables sending and receiving of a plurality of electronic communications from a user;
non-transitory computer-readable storage medium tangibly storing electronic communication software; and
a processor responsive for executing the electronic communication software to:
  track metadata of the plurality of electronic communications of the user, said metadata comprising a time and date and one or more recipient addresses associated with each communication;
  analyze the metadata of each electronic communication;
  determine based on said analysis for each electronic communication, features of each communication between the user and each recipient address, each communication's features comprising activity data between the user and a respective recipient, said activity data indicating a recency and frequency of communication and content relayed during such communications;
  determine coherency information for the plurality of electronic communications based on said determined features of each electronic communication and the activity data that indicates the recency, frequency and content of each communication comprised therein, said coherency information providing an indication as to a logical relationship between each recipient that is defined according to the recency and frequency of communication between each recipient and content relayed during such communications;
  automatically generate and store one or more lists of addresses based on said coherency information;
  receive input comprising an entry of a portion of an electronic address;
  identify electronic addresses of potential recipients from the one or more lists in response to said input;
  electronically recommend the identified electronic addresses to the user, said recommendation facilitating the simultaneous display of a list of a first type of electronic addresses and a list of a second type of electronic addresses;
  receive an input indicative of one or more electronic addresses selected by the user from the identified and recommended electronic addresses;
  responsive to receiving the selecting input, dynamically update and filter the electronic recommendations of identified electronic addresses for both lists; and
  electronically send a message to the one or more selected electronic addresses.

10. The system of claim 9, wherein said list of the electronic addresses of the recipients for the user are stored in an associated non-transitory storage device.

11. A non-transitory computer-readable storage medium tangibly encoded with computer-executable instructions, that when executed by a programmable processor, perform a method comprising:
tracking metadata of a plurality of electronic communications of a user, said metadata comprising a time and date and one or more recipient addresses;
analyzing the metadata of each electronic communication;
determining based on said analysis for each electronic communication, features of each communication between the user and each recipient address, each communication's features comprising activity data between the user and a respective recipient, said activity data indicating a recency and frequency of communication and content relayed during such communications;

determining coherency information for the plurality of electronic communications based on said determined features of each electronic communication and the activity data that indicates the recency, frequency and content of each communication comprised therein, said coherency information providing an indication as to a logical relationship between each recipient that is defined according to the recency and frequency of communication between each recipient and content relayed during such communications;

automatically generating and storing based on said electronic tracking, one or more lists of addresses based on said coherency information;

receiving input comprising an entry of a portion of an electronic address;

identifying electronic addresses of potential recipients from the one or more lists in response to said input;

recommending the identified electronic addresses to the user, said recommendation facilitating the simultaneous display of a list of a first type of electronic addresses and a list of a second type of electronic addresses;

receiving an input indicative of one or more electronic addresses selected by the user from the identified and recommended electronic addresses;

responsive to the received selection input, dynamically updating and filtering the electronic recommendations of identified electronic addresses for both lists; and sending a message to the one or more selected electronic addresses.

12. The non-transitory computer-readable storage medium of claim 11 further comprising:

detecting usage of a plurality of electronic addresses together for more than a predefined number of occurrences; and grouping the plurality of electronic addresses into a group.

13. The non-transitory computer-readable storage medium of claim 11 further comprising:

detecting an electronic address not used previously with the selected electronic addresses; and informing the user of the detected electronic addresses.

14. The non-transitory computer-readable storage medium of claim 11, wherein the recommending comprises:

providing the identified electronic addresses in the form of one or more groups based on a predefined threshold.

* * * * *